C. B. KING.
AUTOMOBILE CONSTRUCTION.
APPLICATION FILED MAR. 17, 1916.

1,289,472.

Patented Dec. 31, 1918.
2 SHEETS—SHEET 1.

INVENTOR
Charles B. King
BY Ralzemond A. Parker
ATTORNEY

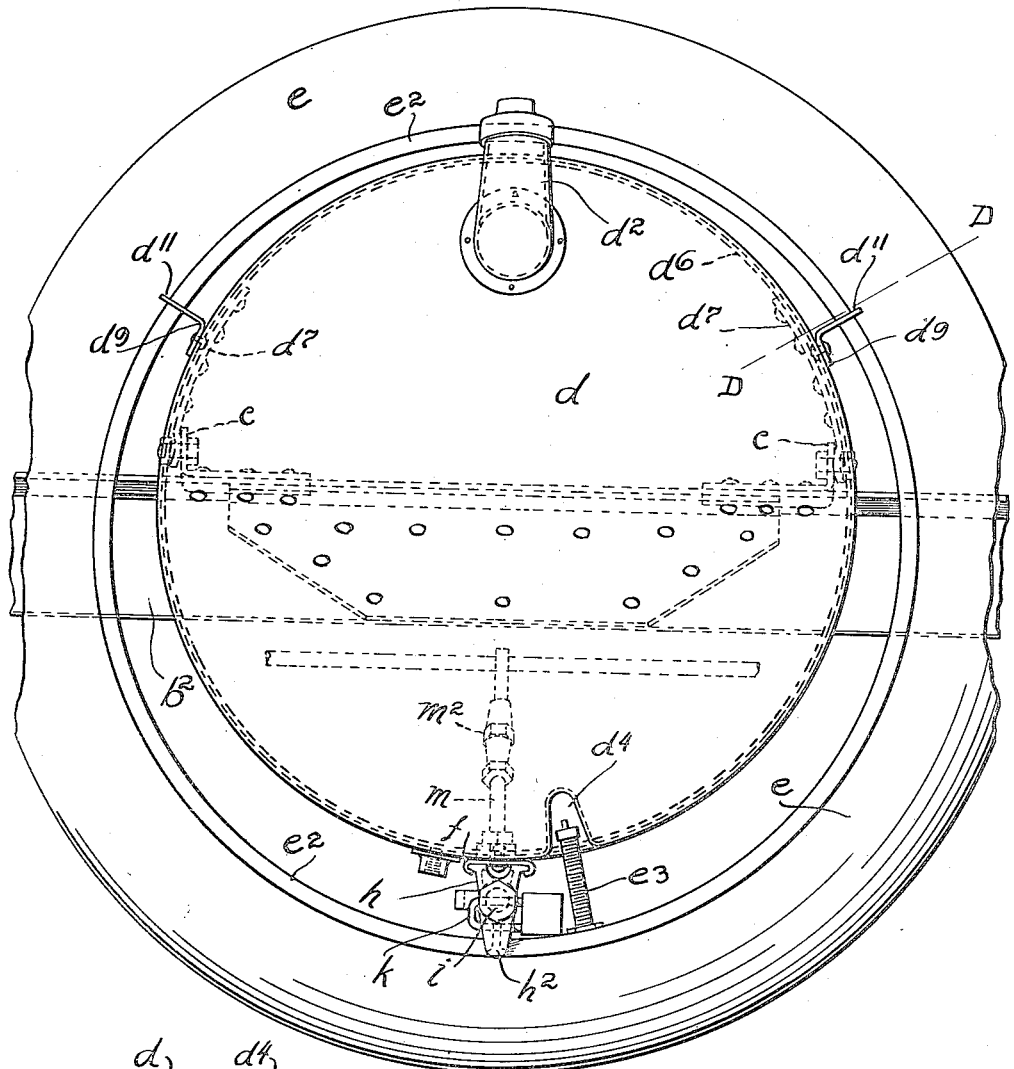
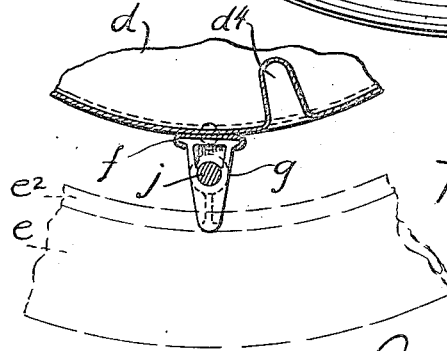
Fig. 2
Fig. 3
INVENTOR
Charles B. King
BY Ratzemond A. Parker
ATTORNEY

UNITED STATES PATENT OFFICE.

CHARLES B. KING, OF DETROIT, MICHIGAN.

AUTOMOBILE CONSTRUCTION.

1,289,472.

Specification of Letters Patent.   Patented Dec. 31, 1918.

Application filed March 17, 1916.   Serial No. 84,779.

*To all whom it may concern:*

Be it known that I, CHARLES B. KING, a citizen of the United States, residing at Detroit, county of Wayne, State of Michigan, have invented a certain new and useful Improvement in Automobile Constructions, and declare the following to be a full, clear, and exact description of the same, such as will enable others skilled in the art to which it pertains to make and use the same, reference being had to the accompanying drawings, which form a part of this specification.

My invention relates to automobile construction and an object of my improvements is to economize room and material and to provide a convenient support for extra tires.

I secure this object in the apparatus illustrated in the accompanying drawings in which, Figure 1 is a side elevation partly broken away and in section of the rear portion of an automobile body and chassis and an apparatus embodying my invention secured thereto.

Fig. 2 is a partial rear view of the same.

Fig. 3 is a detail section on the line C—C Fig. 1.

Fig. 4 is a detail sectional view on the line D—D Fig. 2.

Fig. 5 is a detail view illustrating a different adjustment of the apparatus to that shown in Fig. 1.

Fig. 6 is a diagrammatic view illustrating different positions of some of the parts.

Figure 1:
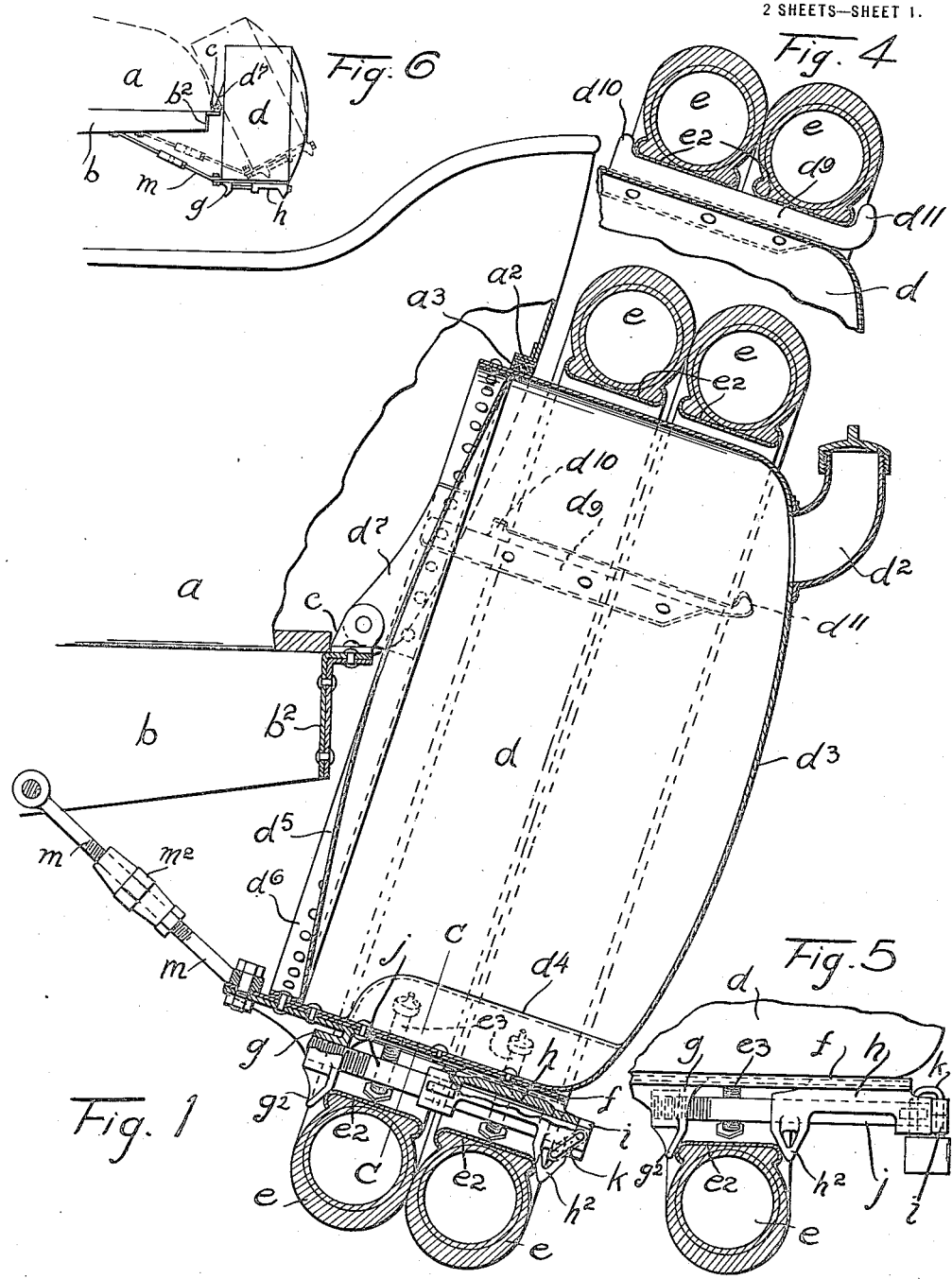

$a$ is the rear portion of an automobile body. $b$ is the side piece and $b^2$ the rear cross piece of the chassis or frame. $c\ c$ are lugs bolted to, and rising from, the cross piece $b^2$, spaced at the proper distance from each other.

$d$ is a fuel tank preferably having the convex outer end $d^3$. $d^2$ is the filling nozzle. $d^4$ is an indentation formed in the periphery of the tank $d$ for the purpose hereinafter noted. $d^5$ indicates the bottom of the fuel tank $d$ which is preferably convex outward and is provided with a peripheral flange $d^6$ adapted to fit within the casing of the gasolene tank $d$ and be bolted thereto, as shown in the drawing. $d^7\ d^7$ are strips of metal riveted to the interior of the flange $d^6$ and forming attaching lugs for the gasolene tank. The ends of the lugs $d^7$ are pivotally secured to the lugs $c$ rising from the cross piece $b^2$ of the chassis. $d^9\ d^9$ are strips of metal riveted to the gasolene tank $d$ and forming supporting flanges extending in radial planes from the periphery of said tank. Each of these flanges has a lug $d^{10}$ at its inner end and $d^{11}$ at its outer end.

$e\ e$ are demountable tires having demountable rims $e^2$ and filling tubes $e^3$, the tires $e\ e$ with their attaching rims are placed over the fuel tank $d$ resting upon the flanges $d^9\ d^9$ and held in place in part by the lug $d^{10}$ and $d^{11}$ rising from said flanges. Said tires are further held in place by a fastening device described as follows:

While I prefer to mount the tires with the rims attached, as above described, nevertheless, the rims may, and sometimes will be, mounted without the tires and the tires without the rims, the mode of attaching being the same in either case.

$f$ is a strip of metal turned up at its edges to form a guide-way and secured along the bottom of the fuel tank $d$ parallel to the axis of said tank. $g$ is a casting forming a securing end which casting is riveted to the fuel tank $d$ and to the inner end of the guide-way $f$. The casting $g$ extends beyond the inner end of the gasolene tank $d$ and has secured to it a rod $m$ which is provided with a turn buckle $m^2$. The other end of the rod $m$ is pivotally attached to the chassis of the vehicle. The rod $m$ is midway between the lateral extremes of the fuel tank $d$ and the attaching lugs $c\ d^7$ are at the side of said tank. By this construction an adjustable three-point suspension for the tank is secured.

$h$ is a sliding head adapted to reciprocate in the guide-way $f$. The casting $g$ is provided with a lug $g^2$ having an inclined surface and the head $h$ is provided at one end with lugs $h^2$ having double inclined surfaces. There is a bolt $j$ having a head $i$ at its outer end and provided with screw threads at its inner end, said bolt passes through apertures adapted to receive it in the head $h$, its head $i$ engaging against the end of the head $h$ and its screw threads engaging the screw threads in an aperture in the casting $g$.

If two tires are to be carried they are placed contiguous with each other at their inner surfaces, as shown in Fig. 1, the rim $e^2$ of the inner one engaging against the inclined surface of the lug $g^2$ of the casting $g$ and the inclined surface of the lug $h^2$ engaging the rim of the outer tire. By screwing up on the bolt $j$ the tires are firmly secured in place and may be prevented from jarring loose by passing the hasp $k$ of a padlock through an aperture in the lug $h^2$ and a hole in the head $i$ of said bolt as illustrated in Fig. 1.

If only one tire is to be carried the sliding head $h$ is reversed and then the lug $h^2$ engages, with its other inclined engaging surface, the rim $e^2$ of the single tire, the same being located where the inner tire was located in the first instance. The head is set up by means of the bolt $j$ as before and secured in place by the hasp of the padlock engaging through the bolt head $i$ and a specially provided aperture at this end of the sliding head.

I cut away the metal of the rear end of the automobile body and turn a flange $a^2$ (Fig. 1) around the edge of the opening thus formed and fit the fuel tank $d$ into said opening interposing a felt strip $a^3$ between the flange $a^2$ and the periphery of the fuel tank $d$.

I have shown a cylindrical tank but other shapes may of course be used and will be included within the scope of my invention.

What I claim is:

1. The combination with an automobile body having an exterior wall, a gasolene fuel tank set into said wall and projecting therefrom and adapted at its projecting portion to hold an automobile tire.

2. In combination with an automobile body having an exterior wall, a cylindrical fuel tank set into said wall and having its axis extending approximately normal to the same, and an automobile tire surrounding the projecting portion of said tank and supported thereby.

3. The combination with an automobile of a gasolene fuel tank, a three-point suspension flexibly securing said tank to said automobile, and an automobile tire supported by said tank.

4. The combination with an automobile body having an exterior rear wall, a cylindrical fuel tank having its axis extending normal to said wall, means for flexibly securing said tank to said automobile, and an automobile tire surrounding said tank and supported thereby.

In testimony whereof I sign this specification.

CHARLES B. KING.